United States Patent [19]

Poos

[11] 3,887,569

[45] June 3, 1975

[54] 2-IMINO-PIPERIDINES

[75] Inventor: George Ireland Poos, Ambler, Pa.

[73] Assignee: McNeil Laboratories, Incorporated, Fort Washington, Pa.

[22] Filed: July 13, 1973

[21] Appl. No.: 379,030

Related U.S. Application Data

[60] Continuation-in-part of Ser. No. 85,734, Oct. 30, 1970, abandoned, which is a division of Ser. No. 738,379, June 17, 1968, abandoned, which is a continuation-in-part of Ser. No. 649,812, June 29, 1967, abandoned, which is a continuation-in-part of Ser. No. 409,563, Nov. 6, 1964, abandoned.

[52] U.S. Cl... 260/293.78; 260/239 B; 260/239 BE; 260/293.51; 260/293.58; 260/293.72; 260/293.73; 260/293.83; 260/293.85; 260/293.9; 260/326.5 A; 260/326.5 D; 260/326.5 L; 260/326.8; 260/326.84; 260/326.85; 260/326.87; 424/244; 424/267; 424/274

[51] Int. Cl............................................ C07d 29/28
[58] Field of Search.................. 260/293.78, 293.58; 85/734; 738/379; 649/812; 409/563

[56] References Cited
UNITED STATES PATENTS
3,531,487   9/1970   Berger et al. .................. 260/293.78

*Primary Examiner*—Norma S. Milestone
*Assistant Examiner*—S. D. Winters

[57] ABSTRACT

The compounds are of the class of 2-iminomethyleneimines which are useful for their antiinflammatory and ganglionic blocking activities, and their effect on blood pressure and heart rate.

3 Claims, No Drawings

2-IMINO-PIPERIDINES

CROSS-REFERENCE TO RELATED APPLICATIONS

This is a continuation-in-part application of my co-pending application Ser. No. 85,734, filed Oct. 30, 1970 now abandoned, which in turn is a divisional application of application Ser. No. 738,379, filed June 17, 1968, now abandoned, which in turn is a continuation-in-part application of application Ser. No. 649,812, filed June 29, 1967, now abandoned, which in turn is a continuation-in-part of application Ser. No. 409,563, filed Nov. 6, 1964, now abandoned.

DESCRIPTION OF THE INVENTION

This invention relates to new chemical compounds and the preparation thereof. More particularly, this invention relates to novel 1-(lower alkyl)-2-aralkylimino-pyrrolidines of the formula:

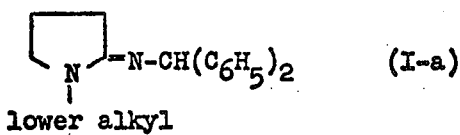

and 1-R$_1$-2-aralkylimino-methyleneimines of the formula:

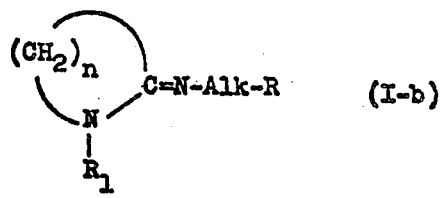

in which Alk represents a member selected from the group consisting of

and a saturated straight or branched chain alkylene having 1 to 3 carbon atoms, R represents a member selected from the group consisting of phenyl and substituted phenyl, R$_1$ is a member selected from the group consisting of lower alkyl and benzyl, and n is a whole integer from 3 to 5. The therapeutically active non-toxic acid addition salts of the foregoing compounds are also embraced within the scope of this invention.

As used herein, "lower alkyl" may be straight or branch chained and have from 1 to 7 carbon atoms, such as, for example, methyl, ethyl, propyl, isopropyl, butyl, tert-butyl, pentyl, hexyl, heptyl and the like; and "substituted phenyl" means a phenyl having one or more substituents attached to it, such as, for example, lower alkyl, lower alkoxy, hydroxy, halo, methylenedi-oxy and the like, the preferred substituents being lower alkyl, lower alkoxy and halo, more preferably, chloro. When more than one substituent is present on said phenyl, they may be the same or different.

The novel compounds of this invention have several useful pharmacological properties which make them suitable for pharmaceutical applications. For example, the compounds of formula (I-a) possess anti-inflammatory activity, as exemplified by 1-methyl-2-[(1,1-diphenylmethyl)imino]-pyrrolidine, which has been observed to produce about a 66% inhibition in the standard kaolin-induced rat paw edema assay after a 100 mg/kg oral dose. In addition, the compounds of formula (I—a) possess central nervous system depressant activity. With the compounds of formula (I—b), wherein R is hydroxy-substituted phenyl, hypotensive and cardiac stimulating activity in anesthetized dogs is observed at doses of about 10 mg/kg i.v. When R is phenyl or halo-substituted phenyl, or when —Alk—R is dialkoxybenzyl, administration of about 1–16 mg/kg i.v. to an anesthetized dog elicits about a 30–40 mm. Hg. rise in arterial blood pressure, indicating pressor activity. In addition, ganglion blocking activity is specifically observed with two types of compounds within formula (I—b), namely, those wherein —Alk—R is either dihalophenethyl or β-methyl-phenethyl at doses of about 10–20 mg/kg i.v. in anesthetized dogs. With the formula (I—b) compounds in which R is lower alkoxy, lower alkyl or methylenedioxy substituted phenyl, a decrease in the heart rate has been found upon i.v. administration to anesthesized dogs without reducing cardiac output or the mechanical work of the heart at doses ranging from about 2.5–10.0 mg/kg. As an example, such effects have been observed upon i.v. administration of 1-methyl-2-[(3,4-dimethoxyphenethyl)imino]-pyrrolidine at a dose of 2.5–5.0 mg/kg. In view of the foregoing, the subject compounds may be formulated into pharmaceutical dosage forms and preparations according to conventional means for, inter alia, oral and parenteral administration.

The subject compounds may be prepared by reacting a fluoborate of formula (II) with a primary amine (III) having the formula NH$_2$—Z, wherein —Z is —CH(C$_6$H$_5$)$_2$ for compounds of formula (I—a) and -Alk-R for compounds of formula (I—b). Stoichiometric quantities of reactants are preferably employed. The starting material II may be prepared according to Ber., 89, 2063 (1956). Suitable organic solvents for conducting the reaction include lower aliphatic alcohols, such as, for example, methanol, ethanol, 2-propanol, tert-butanol and the like; ethers, such as, for example diethylether, tetrahydrofuran, dioxane and the like; lower halogenated hydrocarbons such as chloroform, methylene chloride, 1,2-dichloroethane and the like; and aromatic hydrocarbons such as benzene, toluene, xylene and the like. Elevated temperatures may be advantageously employed during the reaction. The resulting product (IV), in the form of the fluoborate salt, is converted to the corresponding base form (I) by conventional means, for example, by treatment with a suitable alkali such as alkali metal or alkaline earth metal hydroxides, carbonates and the like. The reactions may be illustrated as follows:

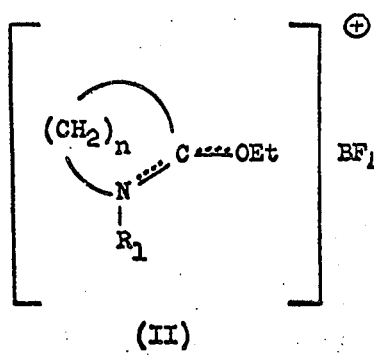
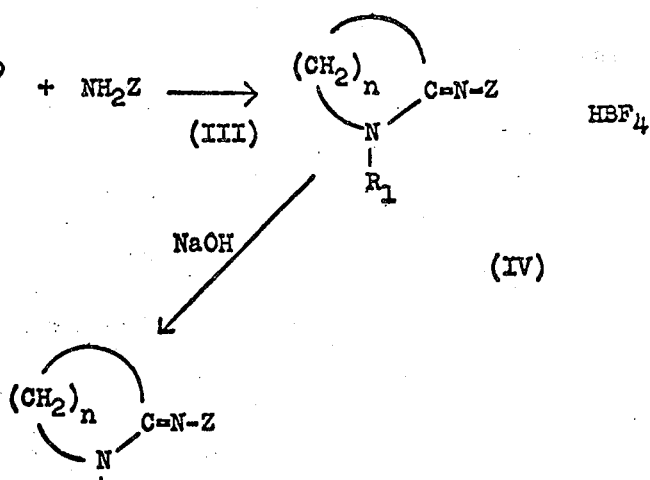
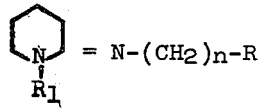

The preferred method of making the 1—R₁—2—[(hydroxyphenyl-Alk)imino]-methyleneimines of formula (I-b) consists in conventional hydrolysis of the alkoxy function in the corresponding 1-R₁-2-[(lower alkoxyphenyl-Alk)imino]-methyleneimines, for example, by refluxing the latter for several hours in glacial acetic acid and hydrobromic acid. In turn, conventional O-alkylation of the hydroxy function, for example, by treatment with an appropriate lower alkyl halide alkylating agent in alcohol under reflux, provides the corresponding 1-R₂-2-[(lower alkoxyphenyl-Alk)imino]-methyleneimines of formula (I-b).

Alternatively, the subject compounds of formula (I-b) may be prepared by reacting a 1-R₁-methyleneimine-2-one lower alkyl acetal [see Annalen, 641, 1 (1961) for the general method of preparing this type of starting material], a 1-R₁-2-lower alkylthiomethyleneiminium salt such as, for example, 1-lower alkyl-2-methylthiopyrrolidinium methosulfate [see Annalen, 651, 89 (1962) for the general method of preparing this type of starting material], or the phosphorous oxychloride adduct or chloride prepared from a 1-R₁-methyleneimine-2-one [see Berichte, 94, 2278 (1961) and Berichte, 96, 2671 (1963) for the general method of preparing these types of starting materials] with the primary amine (III) having the formula NH₂—Z. The reactants are preferably mixed in stoichiometric amounts, either without solvent if the amine is a liquid or with a suitable organic solvent. Elevated temperatures may be advantageously employed during these reactions. The products, when obtained as salts, may be converted to the corresponding base form (I) as described previously.

The subject compounds may be isolated as the free bases by synthetic processes normally employed. These compounds, in base form, are convertible to therapeutically active non-toxic acid addition salts by treatment with an appropriate acid, such as, for example, an inorganic acid, such as, hydrohalic acid, e.g., hydrochloric, hydrobromic, hydroiodic acid; sulfuric or nitric acid; a phosphoric acid; an organic acid, such as, acetic, propionic, glycolic, lactic, pyruvic, malonic, succinic, maleic, fumaric, malic, tartaric, citric, benzoic, cinnamic, mandelic, methanesulfonic, ethanesulfonic, hydroxyethanesulfonic, benzenesulfonic, p-toluenesulfonic, cyclohexanesulfamic, salicylic, p-aminosalicylic, 2-phenoxybenzoic, or 2-acetoxybenzoic acid. Conversely, the salt form can be converted in the usual manner into the free base.

The preferred 2-aralkylimino-1-R₁-piperidines of this invention may be described by the following formula:

wherein $n$ is the integer 1 or 2; $R_1$ is a member selected from the group consisting of loweralkyl and benzyl; and R is a member selected from the group consisting of phenyl, mono- and di-substituted phenyl and methylenedioxyphenyl, each substituent of said substituted phenyls being a member selected from the group consisting of halo, loweralkyl, loweralkoxy and hydroxy.

The invention may be illustrated by, although not limited to the following examples.

EXAMPLE I

1-Methyl-2-[(1,1-diphenylmethyl)imino]-pyrrolidine 21.5 Grams (0.1 mole) of 1-methyl-2-ethoxypyrrolidinium fluoroborate are added to 18.3 grams (0.1 mole) of benzhydrylamine (exothermic reaction). The mixture is heated an additional 15 minutes on a steam cone and then cooled. Ether is added and the crystalline salt collected by filtration. The salt is suspended in water and the mixture made basic with sodium hydroxide solution. The resulting product is extracted into methylene chloride. The extracts are washed once with water, dried over magnesium sulfate, filtered and concentrated in vacuo. The crude crystalline product is slurried in petroleum ether and collected by filtration; m.p. 107°–114°C. Recrystallization from methylene chloride-petroleum ether affords pure 1-methyl-2-[(1,1-diphenylmethyl)imino]-pyrrolidine, m.p., 112°–113°C.

EXAMPLE II

The procedure of Example I is followed, except that equivalent quantities of the 1-ethyl and 1-butyl derivatives of 2-ethoxypyrrolidinium fluoroborate are respectively utilized in lieu of the 1-methyl-2-ethoxypyrrolidinium fluoroborate used therein to yield as products: 1-ethyl-2-[(1,1-diphenylmethyl)imino]-pyrrolidine and 1-butyl-2-[(1,1-diphenylmethyl)imino]-pyrrolidine, respectively.

EXAMPLE III

Treatment of the 1-methyl, 1-ethyl and 1-butyl derivatives of 2-[(1,1-diphenylmethyl)imino]-pyrrolidine obtained from Examples I and II with mineral acids such as hydrochloric acid and hydrobromic acid afford the corresponding acid addition salts thereof.

EXAMPLE IV

1-Methyl-2-benzylimino-pyrrolidine 21.4 Grams (0.2 mole) of benzylamine are added to about 0.15 mole 1-methyl-2-ethoxypyrrolidinium fluoborate (exothermic reaction). After the initial reaction subsides, the mixture is warmed for 1½ hours on a steam cone. The resulting oily fluoborate salt is cooled and washed 3 times with ether, then dissolved in methylene chloride, extracted twice with 10 percent sodium hydroxide, washed with water, dried over magnesium sulfate, filtered and concentrated in vacuo. The oily residue (32.5 g.) of crude 1-methyl-2-benzylimino-pyrrolidine is dissolved in acetone and treated with a solution of 35 grams (0.19 mole) of cyclohexanesulfamic acid in acetone. A first crop of crystals (13.9 g.) is collected by filtration. Dilution of the mother liquor, first with ether and second with petroleum ether, affords two additional batches of crystals (34.0 g.). Recrystallization of the salt from benzene affords 1-methyl-2-benzylimino-pyrrolidine cyclohexanesulfamate, m.p. 80°–83°C.

EXAMPLE V

1-Methyl-2-phenethyliminopyrrolidine 24.2 Grams (0.2 mole) of β-phenethylamine is added to about 0.15 mole 1-methyl-2-ethoxypyrrolidinium fluoborate (exothermic reaction). After additional heating on a steam cone for 5 minutes, the reaction mixture crystallizes. The mixture is cooled, slurried in ether and filtered, giving 41.4 grams of the fluoborate salt of the product. The salt is dissolved in methylene chloride and washed 3 times with dilute sodium hydroxide and once with water, dried over magnesium sulfate, filtered and concentrated in vacuo, affording 31.0 grams of oily product, crude 1-methyl-2-phenethyliminopyrrolidine. The oil is dissolved in acetone and treated with a solution of 27.5 grams of cyclohexane-sulfamic acid in acetone. After cooling, the crystals are collected by filtration, m.p. 107°–110°C. Recrystallization from acetone gives 1-methyl-2-phenethyliminopyrrolidine cyclohexanesulfamate, m.p. 109°–112.5°C.

EXAMPLE VI

1-Methyl-2-[(d-2-methylphenethyl)imino]pyrrolidine.

To 20 grams (0.093 mole) of 1-methyl-2-ethoxypyrrolidinium fluoborate is added 15 grams (0.11 mole) of d-amphetamine. Crystallization begins within a few minutes and is allowed to continue at room temperature. Ether is added and the slurry cooled in an ice-bath. The salt crystals are collected by filtration. The salt is dissolved in methylene chloride, extracted twice with dilute sodium hydroxide, washed with water, dried over magnesium sulfate, filtered and concentrated in vacuo. The residual oil of crude 1-methyl-2-[(d-2-methyl-phenethyl)imino]pyrrolidine is purified by column chromatography over basic alumina (Woelm) and converted to its perchlorate salt in 95 percent ethanol. There is thus obtained 17.1 grams (49.5%) of pure 1-methyl-2-[d-2-methylphenethyl)imino]pyrrolidine perchlorate, m.p. 129.5°–130.5°C.

EXAMPLE VII

1-Methyl-2-(p-chlorobenzylimino)pyrrolidine.

To 20 grams (0.09 mole) of 1-methyl-2-ethoxypyrrolidinium fluoborate is added 14.2 grams (0.1 mole) of p-chlorobenzylamine. After the initial reaction subsides, the mixture is heated on a steam cone for 10 minutes and then cooled. The oily product is washed 3 times with ether, dissolved in methylene chloride, washed 3 times with 10 percent sodium hydroxide, dried over magnesium sulfate, filtered and concentrated in vacuo (yield, 21.6 grams). The oily residue of crude 1-methyl-2-(p-chlorobenzylimino)pyrrolidine is dissolved in acetone and treated with 18 grams of cyclohexanesulfamic acid in acetone. The crystalline product is collected by filtration and recrystallized from acetone to give 30 grams (73.5%) of 1-methyl-2-(p-chlorobenzylimino)pyrrolidine cyclohexanesulfamate, m.p. 142°–143°C.

EXAMPLE VIII

The procedure of Example VII is followed, except that an equivalent quantity of p-methylbenzylamine is utilized in lieu of the p-chlorobenzylamine used therein to yield as the respective products: 1-methyl-2-(p-methylbenzylimino)pyrrolidine and the corresponding cyclohexanesulfamate salt.

EXAMPLE IX

1-Methyl-2-[(3,4-dimethoxyphenethyl)imino]pyrrolidine

To 20 grams of 1-methyl-2-ethoxypyrrolidinium fluoroborate is added 18.1 grams (0.1 mole) of β-(3,4-dimethoxyphenyl)ethylamine. After the initial reaction subsides, the mixture is heated for 10 minutes on a steam cone. The mixture is cooled and the crystals are slurried in ether and collected. The solid is slurried in water and the mixture is made basic with 10 percent sodium hydroxide and extracted with methylene chloride. The extracts are dried over magnesium sulfate, filtered and concentrated in vacuo, yielding 30 grams of crude oily 1-methyl-2-[(3,4-dimethoxyphenethyl)imino]pyrrolidine. Column chromatography over basic alumina affords 20 grams of material from the ether eluates. Distillation of this material gives 10 grams of 1-methyl-2-[(3,4-dimethoxyphenethyl)imino]pyrrolidine (b.p. 161°–169°C./0.35 mm.), which is dissolved in acetone and treated with 7.1 grams (0.04 mole) of cyclohexanesulfamic acid in acetone. When crystallization is complete, the material is filtered, yielding 1-methyl-2-[(3,4-dimethoxyphenethyl)imino]pyrrolidine cyclohexanesulfamate, m.p. 128°–130.5°C.

EXAMPLE X

1-Methyl-2-[(trans-2-phenylcyclopropyl)imino]pyrrolidine

To 20 grams of 1-methyl-2-ethoxypyrrolidinium fluoborate is added 13.3 grams (0.1 mole) of trans-2-phenylcyclopropylamine (exothermic reaction). The mixture is heated for 10 minutes on a steam cone, and, after cooling, washed 3 times with ether. It is then dissolved in methylene chloride, washed twice with 10 percent sodium hydroxide, dried over magnesium sulfate, filtered and concentrated in vacuo. The crude reaction product is chromatographed over basic alumina. Elution with petroleum ether and ether yields 19.1 grams of material from the eluates which is then distilled to give 15.8 grams of 1-methyl-2-[(trans-2-phenylcyclopropyl)imino]pyrrolidine (b.p. 143°–145°C./0.7 mm.). The purified base is dissolved in acetone and a solution of 13.2 grams (0.07 mole) of cyclohexanesulfamic acid in acetone is added. The mixture is cooled and the crystals of 1-methyl-2-[(trans-2-phenylcyclopropyl)imino]pyrrolidine cyclohexanesulfamate are collected on a filter, m.p. 116.5°–118.5°C.

EXAMPLE XI

2-[(3',4'-Dimethoxyphenethyl)imino]-1-ethyl-pyrrolidine perchlorate.

Triethyloxonium fluoborate is prepared from 11.25 g. (0.08 mole) of boron trifluoride etherate and 5.55 g. (0.06 mole) of epichlorohydrin in ether. The salt is washed with ether by decantation and treated with an ether solution of 6.8 g. (0.06 mole) of 1-ethyl-2-pyrrolidone. After stirring at room temperature for 4 hours, the oily salt is washed with ether by decantation, dissolved in methylene chloride and treated with a solution of 9.06 g. (0.05 mole) of β-(3,4-dimethoxyphenyl)ethylamine. After stirring at room temperature for 17 hours, the reaction mixture is washed with dilute sodium hydroxide, dried over anhydrous magnesium sulfate, filtered and concentrated in vacuo, yielding about 15 g. of crude oily 2-[(3',4'-dimethoxyphenethyl)imino]-1-ethyl-pyrrolidine which is distilled. the desired fraction distills at 140°–155°C./0.25 mm. Hg. The thus-obtained 2-[(3',4'-dimethoxyphenethyl)imino]-1-ethyl-pyrrolidine is dissolved in ethanol and treated with an ethanolic solution of 5.25 g. of perchloric acid in ethanol. Dilution with ether yields crystals of 2-[(3',4'-dimethoxyphenethylOimino]-1-ethylpyrrolidine perchlorate, which are collected by filtration, washed with ether and air-dried to give the pure perchlorate, m.p. 102°–104.5°C.

Analysis:

Calcd. for $C_{16}H_{24}N_2O_2.HClO_4$:

C, 50.99; H, 6.69; N, 7.44; Cl, 9.41%

Found : C, 51.10; H, 6.72; N, 7.41; Cl, 9.46%

EXAMPLE XII

The procedure of Example XI is repeated, except that an equivalent quantity of an appropriate amine, i.e., "NH₂Z", is used in place of the β-(3,4-dimethoxyphenyl)ethylamine used therein to yield, as respective products, the following imino-pyrrolidines, both in base form and as the corresponding perchlorate salt:

2-benzylimino-1-ethyl-pyrrolidine;
2-phenethylimino-1-ethyl-pyrrolidine;
2-(p-chlorobenzyl)imino-1-ethyl-pyrrolidine; and
2-(p-methylbenzyl)imino-1-ethyl-pyrrolidine.

EXAMPLE XIII

2-[(2',4'-Dimethoxyphenethyl)imino]-1-methylpyrrolidine perchlorate.

Triethyloxonium fluoborate is prepared from 9.45 g. (0.0665 mole) of boron trifluoride etherate and 4.6 g. (0.0495 mole) of epichlorohydrin. The salt is washed with ether by decantation and treated with a solution of 4.12 g. (0.0415 mole) of 1-methyl-2-pyrrolidone in ether. After stirring at room temperature for 2.5 hours, the oily salt is washed with ether, dissolved in methylene chloride and treated with a solution of 7.5 g. (0.0415 mole) of 2,4-dimethoxyphenethylamine in methylene chloride. After stirring at room temperature overnight, the reaction mixture is washed with dilute sodium hydroxide, dried over anhydrous magnesium sulfate, filtered and concentrated to dryness in vacuo giving 2-[(2',4'-dimethoxyphenethyl)imino]-1-methyl-pyrrolidine which is dissolved in ethanol and treated with a solution of 5.35 g. of perchloric acid in ethanol. Dilution with ether and scratching afforded crystals which are collected by filtration and air-dried to give the perchlorate salt of 2-[(2',4'-dimethoxyphenethyl)imino]-1-methyl-pyrrolidine, m.p. 128.5°–131°C. After recrystallization from ethanol, the melting point is m.p. 129–132°C.

Analysis:

Calcd. for $C_{15}H_{22}N_2O_2.HClO_4$ :

C, 49.65; H, 6.39; N, 7.72; Cl, 9.77

Found : C, 49,66; H, 6.41; N, 7.85; Cl, 9.64

EXAMPLE XIV

2-[(3',4'-Dimethoxy--methylphenethyl)imino]-1-methylpyrrolidine perchlorate.

Triethyloxonium fluoborate is prepared from 5.55 g. (0.06 mole) of epichlorohydrin and 11.25 g. (0.08 mole) of boron trifluoride etherate. The salt is washed with ether and a solution of 4.95 g. (0.05 mole) of 1-methyl-2-pyrrolidone in ether is added. After stirring at room temperature for 3 hours, the salt is washed with ether, dissolved in methylene chloride and to it is added a solution of 9.75 g. (0.05 mole) of 3,4-dimethoxy-α-methylphenethylamine. After stirring at room temperature overnight, the solution is washed with dilute sodium hydroxide, dried over anhydrous magnesium sulfate, filtered and concentrated in vacuo giving an oily residue of crude 2-[(3',4'-dimethoxy-α-methylphenethyl)imino]-1-methylpyrrolidine which is suspended in dilute sodium hydroxide and extracted with benzene. The extracts are combined and dried over anhydrous magnesium sulfate, filtered and concentrated in vacuo to give the oily base once again which is dissolved in ethanol and converted to the perchlorate salt in the usual manner, m.p. 141°–144°C.

EXAMPLE XV

2-[(3',4'-Dichlorophenethyl)imino]-1-methyl-pyrrolidine cyclohexanesulfamate.

Triethyloxonium fluoborate is prepared in ether from 5.55 g. (0.06 mole) of epichlorohydrin and 11.25 g. (0.08 mole) of boron trifluoride etherate. The salt is washed with ether by decantation and treated with a solution of 4.95 g. (0.05 mole) of 1-methyl-2-pyrrolidone in ether. The salt is washed with ether and dissolved in methylene chloride. 11.3 Grams (0.05 mole) 0f β-(3,4-dichlorophenyl)-ethylamine is dissolved in water, made basic with sodium hydroxide and extracted with methylene chloride. The extracts are combined and dried over anhydrous magnesium sulfate, filtered and concentrated to about 70 ml. and added dropwise to the methylene chloride solution of the pyrrolidinium fluoborate salt previously prepared. After stirring at room temperature overnight, the reaction solution is washed with dilute sodium hydroxide, dried over anhydrous magnesium sulfate, filtered and concentrated in vacuo, giving oily 2-[(3',4'-dichlorophenethyl)imino]-1-methyl-pyrrolidine which is dissolved in ether-dilute HCl and the layers separated. The ether solution is washed with dilute HCl and the combined acid extracts are washed with ether, made basic with sodium hydroxide and extracted with methylene chloride. After drying and evaporating to dryness there is obtained about 12 g. of oily 2-[(-3',4'-dichlorophenethyl)imino]-1-methyl-pyrrolidine which is dissolved in acetone and treated with a solution of 8.1 g. (0.045 mole) of cyclohexylsulfamic acid in acetone. The solution is concentrated and diluted with ether. The resulting crystals of 2-[(3',4'-dichlorophenethyl)imino]-1-methyl-pyrrolidine cyclohexanesulfamate are cooled, collected by filtration and dried. After recrystallization from acetone-ether, the m.p. is 136°-141°C.

EXAMPLE XVI

1-Benzyl-2-[(3',4'-dimethoxyphenethyl)imino]-pyrrolidine cyclohexanesulfamate.

Triethyloxonium fluoborate is prepared from 5.55 g. (0.06 mole) of epichlorohydrin and 11.25 g. (0.08 mole) of boron trifluoride etherate. The salt is washed with ether and treated with an ether solution of 10.5 g. (0.06 mole) of 1-benzyl-2-pyrrolidone and stirred at room temperature for three hours. The salt is washed with ether and dissolved in methylene chloride and treated with a solution of 9.06 g. (0.05 mole) of β-(3,4-dimethoxyphenyl)ethylamine in methylene chloride. After stirring at room temperature overnight, the reaction mixture is washed with dilute sodium hydroxide, dried and concentrated in vacuo, affording oily 1-benzyl-[(3',4'-dimethoxyphenethyl)imino]-pyrrolidine. After an acid-base separation, there is obtained about 16 g. of oily base which is distilled in vacuo to give pure 1-benzyl-2-[(3',4'-dimethoxyphenethyl)imino]-pyrrolidine, b.p. 180°-192°C./0.2 mm. Hg., which is dissolved in acetone and converted to its cyclohexanesulfamic salt by the addition of 5.1 g. of cyclohexylsulfamic acid in acetone. Dilution with ether affords crystals of the salt which are collected by filtration, m.p. 103°-108°C.

EXAMPLE XVII

By following the procedure of Example XVI, except that an equivalent quantity of an appropriate aralkyl amine, i.e., "H₂N-Z", is employed instead of the β-(3,-4-dimethoxyphenyl)-ethylamine used therein, the following are obtained as respective products, both as free base and corresponding cyclohexanesulfamate salt:

1-benzyl-2-(p-chlorobenzyl)imino-pyrrolidine;
1-benzyl-2-(p-methylbenzyl)imino-pyrrolidine;
1-benzyl-2-benzylimino-pyrrolidine;
1-benzyl-2-[(3',4'-dichlorophenethyl)imino]-pyrrolidine; and
1-benzyl-2-[(3',4'-methylenedioxyphenethyl)imino]-pyrrolidine.

EXAMPLE XVIII

2-[(3',4'-Methylenedioxyphenethyl)imino]-1-methylpyrrolidine perchlorate.

Triethyloxonium fluoborate is prepared in ether from 5.55 g. (0.06 mole) of epichlorohydrin and 11.25 g. (0.08 mole) of boron trifluoride etherate. The salt is washed with ether by decantation and to it is added a solution of 4.95 g. (0.05 mole) of 1-methyl-2-pyrrolidone in ether. After stirring for 2 hours, the salt is washed with ether by decantation and dissolved in methylene chloride. To it is added a solution of 8.25 g. (0.05 mole) of 3,4-methylenedioxy-β-phenethylamine in methylene chloride. The reaction mixture is stirred for 2 hours at room temperature and allowed to stand overnight. The solution is then washed with dilute sodium hydroxide, dried over magnesium sulfate, filtered, and concentrated to dryness in vacuo, giving oily 2([(-3',4'-methylenedioxyphenethyl)imino]-1-methyl-pyrrolidine which is dissolved in acetone and treated with 6.75 g. of perchloric acid. Dilution with ether yields crystals of the corresponding perchlorate salt, m.p. 133°-136°C. Recrystallization from acetone raises the m.p. to 136°-140°C.

EXAMPLE XIX

2-[(p-Methoxyphenethyl)imino]-1-methyl-pyrrolidine cyclohexanesulfamate is obtained by repeating the procedure of Example XV, except that an equivalent amount of β-(p-methoxyphenyl)-ethylamine is employed in place of the dichlorophenethylamine used therein, m.p. 107°-112°C.

EXAMPLE XX

2-[(m-Methoxyphenethyl)imino]-1-methyl-pyrrolidone perchlorate is obtained by following the procedure of Example XI, except that an equivalent amount of 1-methyl-2-pyrrolidone is used in place of 1-ethyl-2-pyrrolidone and an equivalent amount of β-m-methoxyphenethylamine is used in place of the dimethoxyphenethylamine used therein, m.p. 101°-103°C. (free base distills at 130°-135°C./0.3mm. Hg.).

EXAMPLE XXI

2-[(3',4'-Dimethoxybenzyl)imino]-1-methylpyrrolidine perchlorate hemihydrate.

A solution of 5.55 g. (0.06 mole) of epichlorohydrin in ether is added dropwise with stirring to a solution of 11.25 g. (0.08 mole) of boron trifluoride etherate in ether. After stirring for 2 hours, the oily salt is washed with ether by decantation, dissolved in methylene chloride and treated with a solution of 4.95 g. (0.05 mole) of 1-methyl-2-pyrrolidone in methylene chloride. After stirring for 2 hours, a solution of 8.36 g. (0.05 mole) of veratrylamine in methylene chloride is added. After stirring at room temperature overnight, the solution is washed with dilute sodium hydroxide, dried over magnesium sulfate, filtered and concentrated to dryness in vacuo, affording the crude oily base, 2-[(3',4'-dimethoxybenzyl)imino]-1-methyl-pyrrolidine. An acid-base separation affords the oily base which is distilled at 141°-145°C./0.1-0.05 mm. Hg. A solution of the latter in ethanol is treated with a solution of 3,86 g. of 70% perchloric acid in ethanol. Cooling and scratching yields crystals of 2-[(3',4'-dimethoxybenzyl)imino]-1-methylpyrrolidine perchlorate hemihydrate which are collected and recrystallized from ethanol (charcoaled), m.p. 135°-138°C.

EXAMPLE XXII

2-[(3',4'-Dimethoxyphenethyl)imino]-1-methylpiperidine perchlorate.

Triethyloxonium fluoborate is prepared in ether from 11.25 g. (0.8 mole) of boron trifluoride etherate and 5.55 g. (0.06 mole) of epichlorohydrin. The salt is washed with ether by decantation and treated with an ether solution of 5.65 g. (0.05 mole) of 1-methyl-2-piperidone in ether. After stirring for 3 hours, the prperidinium fluoborate is washed with ether, dissolved in methylene chloride and treated with a solution of 9.06 g. (0.05 mole) of β-(3,4-dimethoxyphenethyl)amine in methylene chloride. After stirring at room temperature overnight, the reaction solution is washed with dilute sodium hydroxide, dried over magnesium sulfate, filtered and concentrated in vacuo, yielding crude oily 2-[(3',4'-dimethoxyphenethyl)imino]-1-methylpiperidine. An acid-base separation affords the pure oily 2-[(3',4'-dimethoxyphenethyl)imino]-1-methylpiperidine. An ethanol solution of 4.5 g. (0.0445 mole) of 70% perchloric acid is added to the oily base in ethanol. Cooling and scratching affords crystals of the corresponding perchlorate salt which are collected by filtration, washed with ethanol and ether and air-dried, m.p. 135°–138°C. Recrystallization from ethanol raises the m.p. to 139°–141°C.

EXAMPLE XXIII

By repeating the procedure of Example XXII, except that an equivalent amount of an appropriate amine, i.e., "H₂N-Z", is used in place of the dimethoxyphenethylamine, and an equivalent amount of an appropriate 1-alkyl or 1-benzyl piperidone is used in place of the 1-methyl-2-piperidone, the following are obtained as respective products in the form of a perchlorate salt:

2-benzylimino-1-ethyl-piperidine;
2-phenethylimino-1-ethyl-piperidine;
2-(p-chlorobenzyl)imino-1-benzyl-piperidine;
2-(p-methylbenzyl)imino-1-ethyl-piperidine;
2-[(3',4'-dichlorophenethyl)imino]-1-benzyl-piperidine;
2-[(3',4'-diethoxyphenethyl)imino]-1-methyl-piperidine; and
2-[(p-methoxyphenethyl)imino]-1-methyl-piperidine.

EXAMPLE XXIV

2-[(3',4'-Dimethoxyphenethyl)imino]-hexahydro-1-methyl-2H-azepine perchlorate.

Triethyloxonium fluoborate is prepared from 5.55 g. (0.06 mole) of epichlorohydrin and 11.25 g. (0.08 mole) of boron trifluoride etherate in ether. The salt is washed with ether by decantation and treated with a solution of 7.65 g. (0.06 mole) of N-methylcaprolactam in ether. After stirring at room temperature for 3 hours, the crystalline salt is washed with ether by decantation, dissolved in methylene chloride and treated with a methylene chloride solution of 9.06 g. (0.05 mole) of β-(3,4-dimethoxyphenyl)-ethylamine. After stirring at room temperature overnight, the reaction mixture is washed with dilute sodium hydroxide, dried and concentrated in vacuo, giving crude oily 2-[(3',4'-dimethoxyphenethyl)imino]-hexahydro-1-methyl-2H-azepine. An acid-base separation affords the base which is distilled off (b.p. 180°–185°C./0.5 mm. Hg.). An acetone solution of the latter and an acetone solution of cyclohexane-sulfamic acid are mixed together. The cyclohexanesulfamate salt of any residual phenethylamine precipitates and is removed. The mother liquor is concentrated and treated with sufficient 50% aqueous sodium hydroxide to convert the cyclohexanesulfamate salt back to the free base, which is extracted into methylene chloride. The methylene chloride solution is dried over anhydrous magnesium sulfate and then concentrated in vacuo. The residual oily base is then treated with an equivalent amount of perchloric acid in ethanol in the usual manner to yield the desired 2-[(3',4'-dimethoxyphenethyl)imino]-hexahydro-1-methyl-2H-azepine perchlorate as crystals, m.p. 126°–130°C. Recrystallization from ethanol raises the m.p. to 130°–135°C.

EXAMPLE XXV

By repeating the procedure of Example XXIV, except that an equivalent amount of an appropriate amine ("H₂H-Z") and an equivalent amount of an appropriate N-alkyl or N-benzyl hexahydro-2H-azepine-2-one is used in place of N-methylcaprolactam, the following are obtained as respective products in the form of a perchlorate salt:

2-(p-fluorobenzyl)imino-1-ethyl-hexahydro-2H-azepine;
2-[(β-4'-bromophenethyl)imino]-1-benzyl-hexahydro-2H-azepine;
2-[(β-4-methylphenethyl)imino]-1-n-butyl-hexahydro-2H-azepine; and
2-[(β-3',4'-methylenedioxy-phenethyl)imino]-1-ethyl-hexahydro-2H-azepine.

EXAMPLE XXVI

2-[(3',4'-Dimethoxyphenethyl)imino]-1-n-butylpyrrolidine cyclohexanesulfamate.

1-n-Butyl-2-pyrrolidone (14.12 g., 0.1 mole) is dissolved in 25 ml. of benzene and cooled in a water bath. To this solution is added, with stirring 15.2 g. (0.1 mole) of phosphorous oxychloride and after refluxing for 10 minutes, the reaction mixture is cooled to room temperature. A solution of 18.12 g. (0.1 mole) of β-3,4-dimethoxy-phenethylamine in 25 ml. of benzene is added dropwise with stirring to the above solution (water bath cooling continued). A slurry forms but dissolves with heating. The reaction mixture is refluxed for 2 hours; cooled to room temperature and poured onto 100 ml. of water containing 4.0 g. (0.1 mole) of NaOH. The resulting gel is extracted with benzene (4 × 100 ml.). The extracts are combined and dried over anhydrous MgSO₄ and evaporated in vacuo leaving an oily residue. After acid-base purification, the product is extracted into ether (4 × 100 ml.). The combined extracts are dried over anydrous MgSO₄ and evaporated in vacuo leaving an oily residue which is dissolved in acetone. An equivalent amount of cyclohexylsulfamic acid dissolved in acetone is added. Cooling and scratching affords the crude product, 2-[(3',4'-dimethoxyphenethyl)imino]-1-n-butylpyrrolidine cyclohexanesulfamate, m.p. 92°–95.5°C. Recrystallization from acetone gives the pure product, m.p. 95°–97°C.

EXAMPLE XXVII

2-[(3',4'-Diethoxyphenethyl)imino]-1-methylpyrrolidine cyclohexanesulfamate.

To 0.06mole of triethyloxonium fluoborate [prepared by the method of Meerwein et al., Ann., 641, 1 (1961)]in ether is added 5.95 g. (0.06 mole) of 1-methyl-2-pyrrolidone in 30 ml. of dry ether. After stirring under dry nitrogen for 3 hours at room temperature, the resulting oil is washed by decantation (4 × 50.75 ml. of dry ether), dissolved in methylene chloride and treated with 10.46 g. (0.05 mole) of β-3,4-diethoxyphenethylamine in 30 ml. of methylene chloride. The reaction mixture is stirred overnight at room temperature under an atmosphere of dry nitrogen. The reaction mixture is washed with dilute NaOh (10%) (2 × 75 ml.). Extraction of the product into dilute HCl (10%) followed by basification with excess NaOh (50%) and ether extraction gives after drying (MgSO₄) and solvent removal in vacuo, about 9.5 g. of oily 2-[(3',4'-diethoxyphenethyl)imino]-1-methylpyrrolidine. An acetone solution of the oil is treated with 5.9 g. (0.0327 mole) of cyclohexanesulfamic acid in acetone. Cooling and scratching gives the crude salt, 2-[(3',4'-diethoxyphenethyl)imino]-1-methylpyrrolidine cyclohexanesulfamate. Recrystallization from acetone-ether and acetone affords the pure salt; m.p. 94.5°–96.5°C.

EXAMPLE XXVIII

2-[(3',4'-Diethoxyphenethyl)imino]-1-methylpyrrolidine cyclohexanesulfamate may be also prepared by refluxing 3.15 g. (0.01 mole) of the product of Example XXIX with 4.68 g. (0.03 mole) of ethyl iodide while adding dropwise 6 ml. (0.03 mole) of aqueous 5N NaOH. After the addition is complete, refluxing is continued for 2 hours. Conventional workup and the conversion to the cyclohexanesulfamate salt gives the desired product.

EXAMLPE XXIX

2-[(3',4'-Dihydroxyphenethyl)imino]-1-methylpyrrolidine hydrobromide.

Five Grams (0.013 mole) of oily 2-[(3',4'-dimethoxyphenethyl)imino]-1-methyl-2pyrrolidone is dissolved in methylene chloride, cooled to −70°C. and treated with a methylene chloride solution of 2.8 g. (0.013 mole) of boron tribromide. The reaction is then allowed to warm to room temperature and stirred for 4 hours (total). The solution is concentrated in vacuo; the residue is dissolved in methanol, concentrated in vacuo, dissolved in water and concentrated in vacuo. The addition of methanol and ether affords crystals of 2-[(3',4'-dihydrophenethyl)imino]-1-methylpyrrolidine hydrobromide which are recrystallized from methanol ether to give the product as an off-white solid.

EXAMPLE XXX

2-[(3',4'-Dihydroxypnenethyl)imino]-1-methylpyrrolidine.

A solution of 34.35 g. (0.09 mole) of 2-[(3',4'-dimethoxyphenethyl)imino]-1-methylpyrrolidine is refluxed with 68.7 ml. of 48% HBr and 68.7 ml. of glacial acetic acid for 22 hours. Cooling to room temperature affords an impure crop which is removed by filtration. Cooling of the mother liquor in an ice bath affords 2-[(3',4'-dihydroxyphenethyl)imino]-1-methylpyrrolidine as crystals, m.p. 215°–216.5°C.

EXAMLPE XXXI

1-Methyl-2-[(3,4-dimethoxyphenethyl)imino]-pyrrolidine may be also prepared by refluxing an ethanolic solution of 2-[(3',4'-dihydroxyphenethyl)imino]-1-methylpyrrolidine with two equivalents of methyl iodide while adding dropwise an aqueous solution of sodium hydroxide (3 equivalents). Conventional acid-base extraction and conversion to the cyclohexanesulfamate salt gives the desired product.

EXAMPLE XXXII

By repeating the procedure of Example XXIX, except that an equivalent quantity of the 3,4-dimethoxy- and p-methoxy-phenethylimino piperidines (converted to base form) obtained from Examples XXII and XXIII, respectively, are utilized as starting materials, the following products are obtained:

2-[(3',4'-dihydroxyphenethyl)imino]-1-methylpiperidine; and
2-[(p-hydroxyphenethyl)imino]-1-methylpiperidine.

EXAMPLE XXXIII

The procedure of Example XVIII is repeated except that an equivalent amount of an appropriate 1-loweralkyl- or 1-benzyl-2-piperidone is substituted for the 1-methyl-2-pyrrolidone used therein to yield the following respective products in the form of a perchlorate salt;

2-[(3',4'-methylenedioxyphenethyl)imino]-1-methyl-piperidine;

2-[(3',4'-methylenedioxyphenethyl)imino]-1-ethyl-piperidine;

2-[(3',4'-methylenedioxyphenethyl)imino]-1-n-butyl-piperidine; and

2-[(3',4'-methylenedioxyphenethyl)imino]-1-benzyl-piperidine.

What is claimed is:

1. A chemical compound selected from the group consisting of a 2-aralkylimino-1-$R_1$-piperidine having the formula:

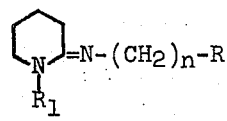

and the therapeutically active acid addition salts thereof, wherein n is the integer 1 or 2; $R_1$ is a member selected from the group consisting of loweralkyl and benzyl; and R is a member selected from the group consisting of phenyl, mono- and di-substituted phenyl and methylenedioxyphenyl, each substituent of said substituted phenyls being a member selected from the group consisting of halo, loweralkyl, loweralkoxy and hydroxy.

2. 2-[(Diloweralkoxyphenethyl)imino]-1-loweralkylpiperidine.

3. 2-[(3',4'-Dimethoxyphenethyl)imino]-1-methylpiperidine.

* * * * *

UNITED STATES PATENT AND TRADEMARK OFFICE
CERTIFICATE OF CORRECTION

PATENT NO. : 3,887,569            Page 1 of 2
DATED : June 3, 1975
INVENTOR(S) : George Ireland Poos It is certified that error appears in the above-identified patent and that said Letters Patent are hereby corrected as shown below:

In Column 5, line 5, "diphenylmethyl" should read --- diphenylmethyl) ---.

In Column 5, line 53, "cyclohexane-sulfamic" should read --- cyclohexanesulfamic ---.

In Column 8, line 26, "C, 49,66" should read --- C, 49.66 ---.

In Column 8, line 29, "Dimethoxy" should read ---- Dimethoxy-$\alpha$ ---.

In Column 8, line 65, "Of" should read --- of ---.

In Column 9, line 62, "methylenedioxyphenethyl-" should read --- methylenedioxyphenethyl) ---.

In Column 9, line 63, ")imino]" should read --- imino] ---.

In Column 10, line 14, "2([("  should read --- 2-[(3' ---.

In Column 10, line 15, delete "3',. ---.

In Column 10, line 58, delete the period (.) after "in vacuo" and insert a comma (,) ---.

In Column 10, line 62, "3,86" should read --- 3.86 ---.

UNITED STATES PATENT AND TRADEMARK OFFICE
CERTIFICATE OF CORRECTION

PATENT NO. : 3,887,569
DATED : June 3, 1975
INVENTOR(S) : George Ireland Poos

It is certified that error appears in the above–identified patent and that said Letters Patent are hereby corrected as shown below:

In Column 3, line 56, (under Example XXX), Dihydroxypnemethyl should be --- Dihydroxyphenethyl---.

In Column 14, line 29, salt; should be salt:

Signed and Sealed this

*ninth* Day of *December 1975*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,887,569
DATED : June 3, 1975
INVENTOR(S) : George Ireland Poos

It is certified that error appears in the above-identified patent and that said Letters Patent are hereby corrected as shown below:

In Column 7, line 47, "dimethoxyphenethylOimino" should read --- dimethoxyphenethyl)imino ---.

In Column 11, line 11, "prperidinium" should read --- piperidinium ---.

Signed and Sealed this sixth Day of January 1976

[SEAL]

Attest:

RUTH C. MASON
Attesting Officer

C. MARSHALL DANN
Commissioner of Patents and Trademarks